July 1, 1941.  F. C. CHIAPPETTI  2,247,629
POWER CRANK
Filed July 9, 1940  2 Sheets-Sheet 1

Inventor
FERNANDO C. CHIAPPETTI

By *Clarence A. O'Brien*

Attorney

July 1, 1941.  F. C. CHIAPPETTI  2,247,629

POWER CRANK

Filed July 9, 1940  2 Sheets-Sheet 2

Inventor

FERNANDO C. CHIAPPETTI

By Clarence A. O'Brien

Attorney

Patented July 1, 1941

2,247,629

UNITED STATES PATENT OFFICE 2,247,629

POWER CRANK

Fernando C. Chiappetti, Flagstaff, Ariz., assignor of one-half to Jeff M. Ferris, Flagstaff, Ariz.

Application July 9, 1940, Serial No. 344,582

1 Claim. (Cl. 74—14)

This invention relates to what is known in the art as a power crank, that is a device whereby without the use of a hand crank the internal combustion engine of a motor vehicle may be caused to "turn over" as when desired by mechanics for testing or repair work.

An object of the present invention is to provide a mobile device of this character particularly designed for use in garages by auto mechanics to simplify and facilitate spotting timing spots on the flywheel; the spacing of the distributor points; the checking of the ignition; the timing and adjusting of valve tappets, the removal and replacement of pistons, the cutting of ridges on top of cylinders in ring installations; the replacing of timing chains; the replacing or refitting of bearings; the overhauling of clutches, and in the saving of time and labor in doing any mechanical jobs necessitating the turning of the motor.

The invention, together with its objects and advantages, will be best understood from a study of the following description taken in connection with the accompanying drawings wherein.

Figure 1:
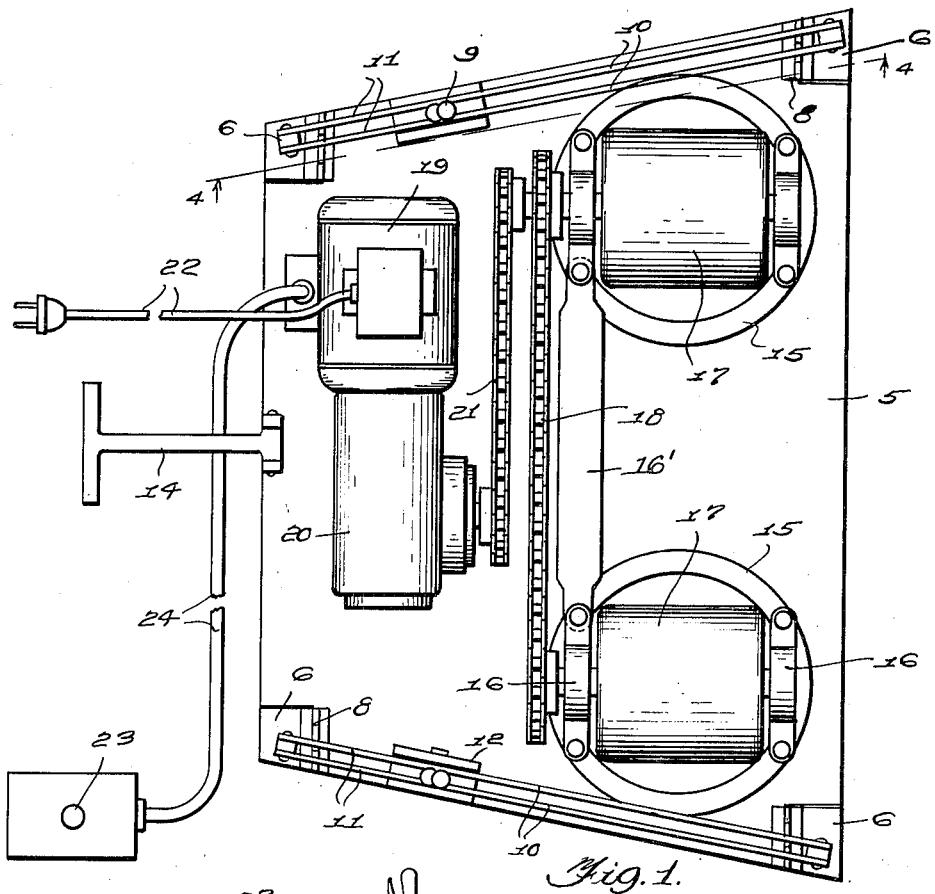
Figure 1 is a top plan view of the power crank embodying the features of the present invention.

Referring more in detail to the drawings, it will be seen that in the preferred embodiment thereof the power crank embodies a truck consisting of a platform 5 of suitable edge contour and having at each of the four corners thereof corner pieces 6 equipped with casters 7 and hinged to the platform as at 8.

At each side of the platform the corner pieces 6 are connected in pairs with a hand lever 9 through the medium of pairs of links 10 and 11, respectively.

Figure 2:
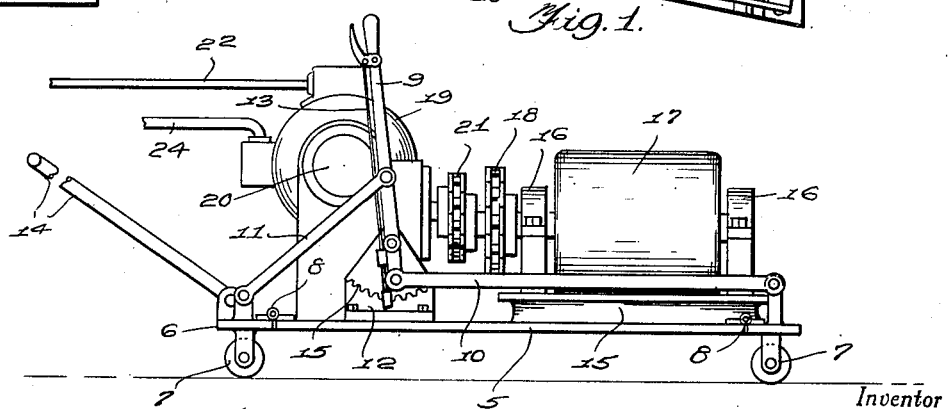
Figure 2 is a side elevational view thereof.
Figure 3:
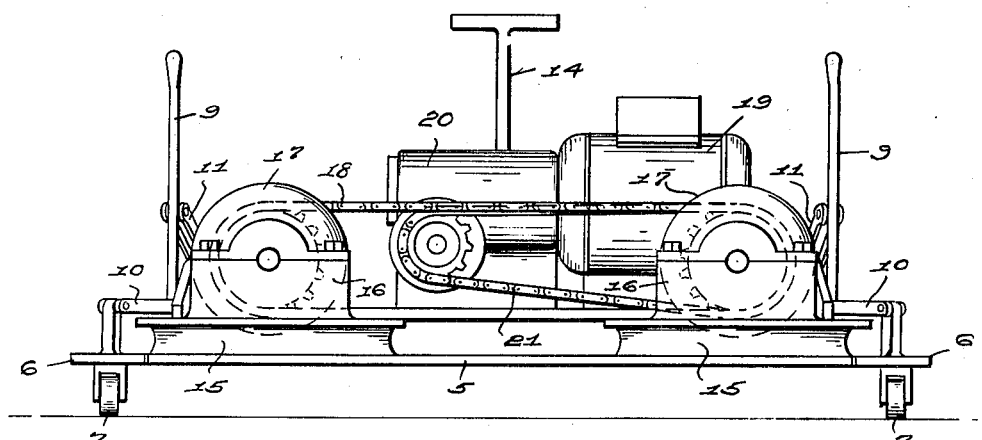
Figure 3 is an elevational view taken at right angles to Figure 2.
Figure 4:
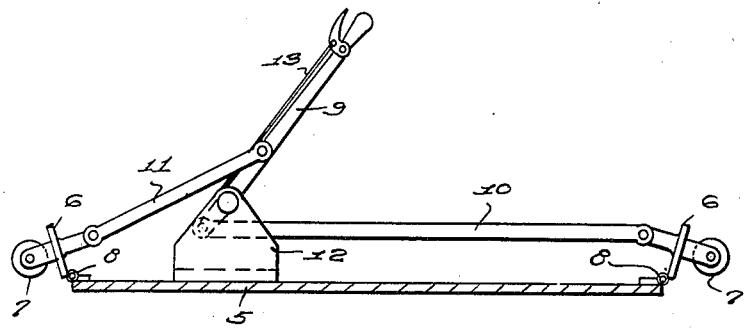
Figure 4 is a sectional view taken substantially on the line 4—4 of Figure 1.

Each hand lever 9 is pivotally mounted on a suitable bracket 12 secured to and rising from the truck platform 5 and is equipped with a detent 13 for cooperation with a rack segment 15 for holding the lever 9 in the position of adjustment to which it is moved, and consequently the rollers 7 in contact with the ground, as shown in Figure 2, and the platform of the truck in elevated position, or in the position shown in Figure 4, out of contact with the ground and the main body of the platform 5 resting flatly on the ground.

Also, to facilitate moving the truck about, the same is equipped with a suitable tongue 14.

Provided on the platform 5 are pedestals 15 and each pedestal is equipped with a pair of bearings 16 to receive the ends of the axle of a roller 17.

A brace bar 16' extends across the space between the pedestals and connects the inner bearings 16 on the two pedestals together as shown in Figure 1.

The axles of the rollers 17 are connected together through the medium of a suitable chain and sprocket drive connection 18.

Also suitably mounted on the platform 5 is a reversible electric motor 19 and connected with the armature shaft of the motor is a suitable speed reduction assembly indicated generally by the reference numeral 20; the driven shaft of the reduction assembly 20 being connected with the axle of one of the rollers 17 through the medium of a chain and sprocket drive connection 21 as shown. It thus will be seen that drive in either direction is transmitted from the motor 19 through the speed reduction assembly 20, chain and sprocket drive connection 21, and chain and sprocket drive connection 18 to the rollers 17 for simultaneously rotating these rollers.

The reversible electric motor 19 is equipped with a suitable conductor cord 22 for placing the motor in a suitable electrical circuit, and for the motor 19 there is also provided a reversible control switch 23 that is capable of being readily positioned at any point remote from the motor and is suitably connected with the motor 19 through the medium of a conductor cord 24 as shown.

The manner of using the device and its many advantages are believed to be apparent, but such use might be briefly described as follows:

With the casters 7 in the ground-engaging position shown in Figure 2, the entire device may be readily moved to the location desired, after which the levers 9 are suitably manipulated to swing the casters 7 from the position shown in Figure 2, to the position shown in Figure 4 for moving the casters out of engagement with the ground and placing the platform 5 of the truck in immediate contact with the ground so that the device will not shift and is then in position to have one of the rear driving wheels of the automobile driven onto, in an obvious manner, the rollers 17. Obviously the switch 23 may be carried by the operator and kept within convenient reach. When he desires to crank or cause the motor of the vehicle to "turn over," all he need do is throw the switch 23 in the proper direction, thus completing the circuit to the motor 19. Drive is transmitted from the motor 19 as previously described to the rollers 17 which causes the drive wheel of the automobile in contact therewith to turn, and this turning movement of the drive wheel is transmitted in a manner well known in the art to the crank shaft of the motor for rotating the latter in the direction desired by the mechanic and at a speed that will enable the mechanic to make the desired test or to ascertain the particular information he is seeking, dependent upon the type of work being done by him. In this connection it will be apparent that by having the switch 23 ever convenient to him the mechanic will not be required to leave his particular position in order to make use of the device for the purpose intended.

While I have herein shown and described a preferred embodiment of the invention, it is to be understood that it is in no wise intended to restrict the invention to the precise details of construction, combination and arrangement of elements as herein illustrated, but that I claim all such forms of the invention to which I am entitled and as come within the scope of the claim hereunto appended.

Having thus described the invention what is claimed as new is:

A power crank for automobiles comprising a truck, a pair of circular pedestals on the truck adjacent one side edge thereof, a pair of bearing members on each pedestal, said bearing members being oppositely arranged, a shaft journaled in each pair of bearing members and extending at right angles to said side edge of the truck, a roller carried by each shaft and having a portion extending into the space formed by the pedestal, sprockets on the inner ends of the shafts, a chain passing over the sprockets, one shaft being extended, a motor on the truck adjacent the other side edge thereof, means for connecting the motor with the extended end of said one shaft, said motor being a reversable one, and a brace bar extending across the space between the pedestals and connected with the inner ends of the inner bearing members.

FERNANDO C. CHIAPPETTI.